(12) United States Patent
McQuaide, Jr.

(10) Patent No.: US 8,325,673 B1
(45) Date of Patent: Dec. 4, 2012

(54) PERSONAL MULTI-DEVICE NOMADIC MEDIA

(75) Inventor: Arnold Chester McQuaide, Jr., Berkeley Lake, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 796 days.

(21) Appl. No.: 11/865,976

(22) Filed: Oct. 2, 2007

(51) Int. Cl.
*H04W 4/00* (2009.01)
*H04J 3/06* (2006.01)

(52) U.S. Cl. .......................... 370/331; 370/350; 370/503

(58) Field of Classification Search ................. 370/252, 370/254, 255, 310, 310.2, 328, 331, 338, 370/347, 395.2, 503
See application file for complete search history.

(56) References Cited

U.S. PATENT DOCUMENTS

| | | | | |
|---|---|---|---|---|
| 5,023,931 A * | 6/1991 | Streck et al. | ..................... | 455/21 |
| 6,507,572 B1 * | 1/2003 | Kumar et al. | ................. | 370/331 |
| 6,810,254 B2 * | 10/2004 | Tiedemann et al. | .......... | 455/437 |
| 6,985,463 B1 * | 1/2006 | Wright et al. | ................. | 370/331 |
| 7,047,009 B2 * | 5/2006 | Laroia et al. | ................... | 455/437 |
| 7,532,597 B2 * | 5/2009 | Venkitaraman | ............... | 370/331 |
| 7,606,186 B2 * | 10/2009 | Hundscheidt et al. | ........ | 370/312 |
| 7,639,115 B2 | 12/2009 | Valoteau et al. | | |
| 7,907,568 B2 * | 3/2011 | Klotsche | ....................... | 370/331 |
| 8,099,504 B2 * | 1/2012 | Cherian et al. | ................ | 709/227 |
| 2002/0067706 A1 * | 6/2002 | Bautz et al. | .................... | 370/331 |
| 2002/0085719 A1 * | 7/2002 | Crosbie | ......................... | 380/248 |
| 2003/0169725 A1 * | 9/2003 | Ahmavaara et al. | .......... | 370/352 |
| 2003/0229900 A1 * | 12/2003 | Reisman | ......................... | 725/87 |
| 2005/0202871 A1 | 9/2005 | Lippincott | | |
| 2006/0114856 A1 * | 6/2006 | Hirata et al. | .................. | 370/331 |
| 2006/0129458 A1 | 6/2006 | Maggio | | |
| 2006/0153133 A1 * | 7/2006 | Zhong | ............................ | 370/331 |
| 2007/0296552 A1 | 12/2007 | Huang et al. | | |
| 2008/0155615 A1 * | 6/2008 | Craner et al. | .................... | 725/91 |
| 2009/0279485 A1 * | 11/2009 | Julka et al. | .................... | 370/328 |
| 2010/0091654 A1 * | 4/2010 | Ohno et al. | .................... | 370/235 |
| 2010/0157882 A1 * | 6/2010 | Moriwaki et al. | ............ | 370/328 |

* cited by examiner

*Primary Examiner* — Warner Wong
(74) *Attorney, Agent, or Firm* — Myers Bigel Sibley & Sajovec

(57) ABSTRACT

Providing personal multi-device nomadic media is described herein. In different aspects, the techniques may include providing content to a user on a first device and suspending the delivery of the content on the first device. The user may register on a second device and resume delivery of the suspended content on the second device.

18 Claims, 6 Drawing Sheets

PERSONAL MULTI-DEVICE NOMADIC MEDIA

FIELD OF THE DISCLOSURE

The present disclosure relates to personal multi-device nomadic media, and more specifically, to techniques and apparatus for accessing media while moving between devices to enable a user to resume content delivery.

BACKGROUND

The advent of digital media has enabled an expanded array of features for content delivery of video and audio media. For example, using a digital video recorder (DVR), a user may pause a live television program and later resume the program from the point of suspension. Typically, DVR systems (or similar systems) store program information in memory using a buffer, which allows a user to pause, rewind and/or fast forward through content provided by the DVR. These features allow additional flexibility in the user's viewing experience. For example, the user may watch half of a television program, answer a telephone call, and then resume the program where the user left off.

DVR systems are typically coupled with displays and other audio and video components, making it difficult to relocate the systems. Many users have multiple DVR systems in a household, such as one for each television in a house. With live television and radio, users have flexibility to discontinue programming in a first location, such as a living room, and resume the programming in a second location, such as a bedroom. However, when a user changes devices that receive the television and/or radio programs, the user will miss any content during the user's transition period between devices.

Therefore, there remains an unmet need to provide increased flexibility of content delivery while using multiple DVR systems within a house or other location.

SUMMARY

Techniques and apparatus for providing personal multi-device nomadic media are described herein. In different aspects, the techniques may include providing content to a user on a first device and suspending the delivery of the content on the first device. The user may register on a second device and resume delivery of the suspended content on the second device.

In other embodiments, an apparatus may include a user identification detector to receive a signal from a remote that includes a user identification. A network interface may be included to communicate the user identification to a second device. A device controller may be operably coupled to the user identification detector and the network interface, the device controller providing a media content to a user associated with the user identification. The controller may further enable suspending the media content and transmitting a packet to the second device, the packet including the user identification associated with the content, the packet enabling the second device to resume the content from a point of suspension.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference number in different figures indicates similar or identical items.

DETAILED DESCRIPTION

Overview

Increased flexibility for transferring content delivery between locations is desirable. For example, a user may desire to pause a television program at a first location and then resume the program, without missing any content, at a second location. DVR systems (or similar systems) enable a user at a single location to pause, save, fast forward, and rewind a program, in addition to other useful features. However, such systems do not currently provide a practical and easy way for users to continue programming at a second location while using the above mentioned features, such as suspending a program. This disclosure provides techniques and systems for exchanging real time and non-real time media between devices to enable a user to resume content delivery in a second location, thus enabling nomadic media delivery.

Illustrative Personal Multi-Device Nomadic Media Configuration

Figure 1:
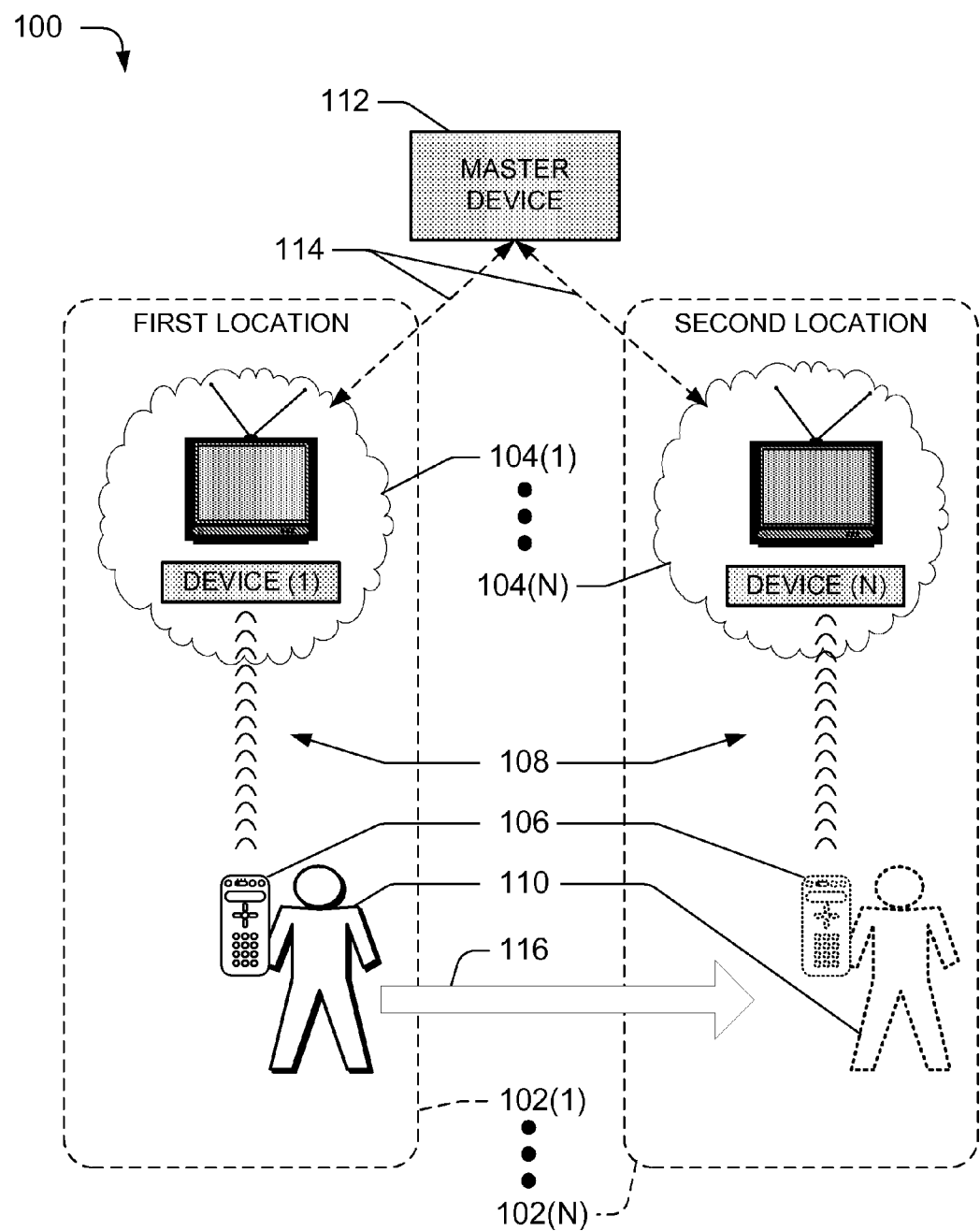
FIG. 1 is a schematic view of an illustrative system for providing personal multi-device nomadic media in accordance with an embodiment of the disclosure.

FIG. 1 is a schematic view of an illustrative system for providing personal multi-device nomadic media in accordance with an embodiment of the disclosure. An environment 100 includes a first location 102(1) having a first device 104(1) in communication with a remote 106. The first device 104(1) may include one or more video, audio, or other entertainment devices. In some instances, the first device 104(1) may be a set top box (STB) in connection to a television. Alternatively or in addition, the first device 104(1) may be a display device such as a television, projector, or monitor.

The remote 106 may be configured to exchange signals with the first device 104(1). The remote 106 may transmit signals 108 using an optical signal, an ultraviolet signal, an infrared signal, an acoustic signal, a Bluetooth® signal, a Wi-Fi signal, a radio-frequency identification (RFID) signal, or a similar signal transmission technique. In some instances, the remote 106 may be a remote control used to controllably operate the first device 104(1). For example, the remote 106 may resemble a universal remote control that may be used to operate a television, digital versatile disc (DVD) player, video cassette recorder (VCR), STB, or cable box. In other instances, the remote may only contain information associated with a user 110 of the remote which may be transmitted to the device 104(1). In operation, the remote 106 may transmit a communication to the first device 104(1) which may include information associated with the user 110 of the remote.

In some embodiments, the first device 104(1) may be in communication with a master device 112. The master device 112 may transmit information to, and receive information from, the first device 104(1) using a wired or wireless connection 114, such as Wi-Fi, Ethernet, Bluetooth®, or coaxial connections. The master device 112 may be in connection with a video and/or audio content provider (not shown). The master device 112 may transmit content to the first device 104(1), such as video or audio content. For example, the master device 112 may be a customer premises equipment (CPE) digital video recorder (DVR) such as that manufactured by TiVo® of TiVo, Inc. of Alviso, Calif. The first device 104(1) may be configured with a signaling channel to support a protocol for communicating user registrations, suspend/resume commands, user de-registrations, and current channel/program selection to the master device 112.

In operation, the first device 104(1) may transmit a request for content to the master device 112, including information related to the user via the remote 106. The master device 112 may receive and process the request, and transmit the requested content to the first device for delivery to the user 110. For example, the user may request a television program using the remote 106, which may transmit a signal to the first device 104(1) along with information associated with the user. The first device 104(1) may relay the signal to the master device 106 to implement the content request. The master device may transmit the requested content to the first device which provides a display of the content to the user 110.

The master device 112 may be in communication with a plurality of devices, such as a second device 104(N), which may include similar functionality as the first device 104(1). The second device 104(N) may be at a second location 102 (N). For example, the environment 100 may represent a customer premises having the first device 104(1) at the first location (e.g., living room) and the second device 104(N) at the second location 102(N) (e.g., kitchen). The user 110 may begin watching content on the first device 104(1), suspend the content on the first device, and relocate (via route 116) to the second location 102(N) where the user resumes the content which was suspended on the first device. In such an instance, the user 110 may be able to view the entire content despite changing locations and incurring a gap in time between viewing locations.

In an illustrative operation, the remote 106 may be used to transmit information associated with the user 110, such as an identification (ID) number to the first device 104(1) which may be relayed to the master device 112. The user 110 may suspend the content delivered on the first device 104(1), thus suspending the content transmission from the master device 112. The user may move to the second location and activate the second device 104(N) with the remote 106. The second device 104(N) may transmit information to the master device 112 including the information associated with the user 110 (e.g., an ID number), thus enabling the master device 112 to recall the user's previous viewing information (e.g., a viewing log) generated from the content delivery on the first device 104(1). The master device 112 may resume transmitting the content to the second device 104(N) with the information generated in the log. This may allow a user to view the content on the second device 104(N) from the point in the content where the user left off from the first device 104(1), such as ten minutes and fifteen seconds into a television program. Using the techniques and systems disclosed, the user 110 may be able to move between locations having devices, such as the first device 104(1) in connection to a master device 112, and enjoy content delivery with capabilities including pausing, rewinding, and fast-forwarding a program, among other features enabled by the master device.

Figure 2:
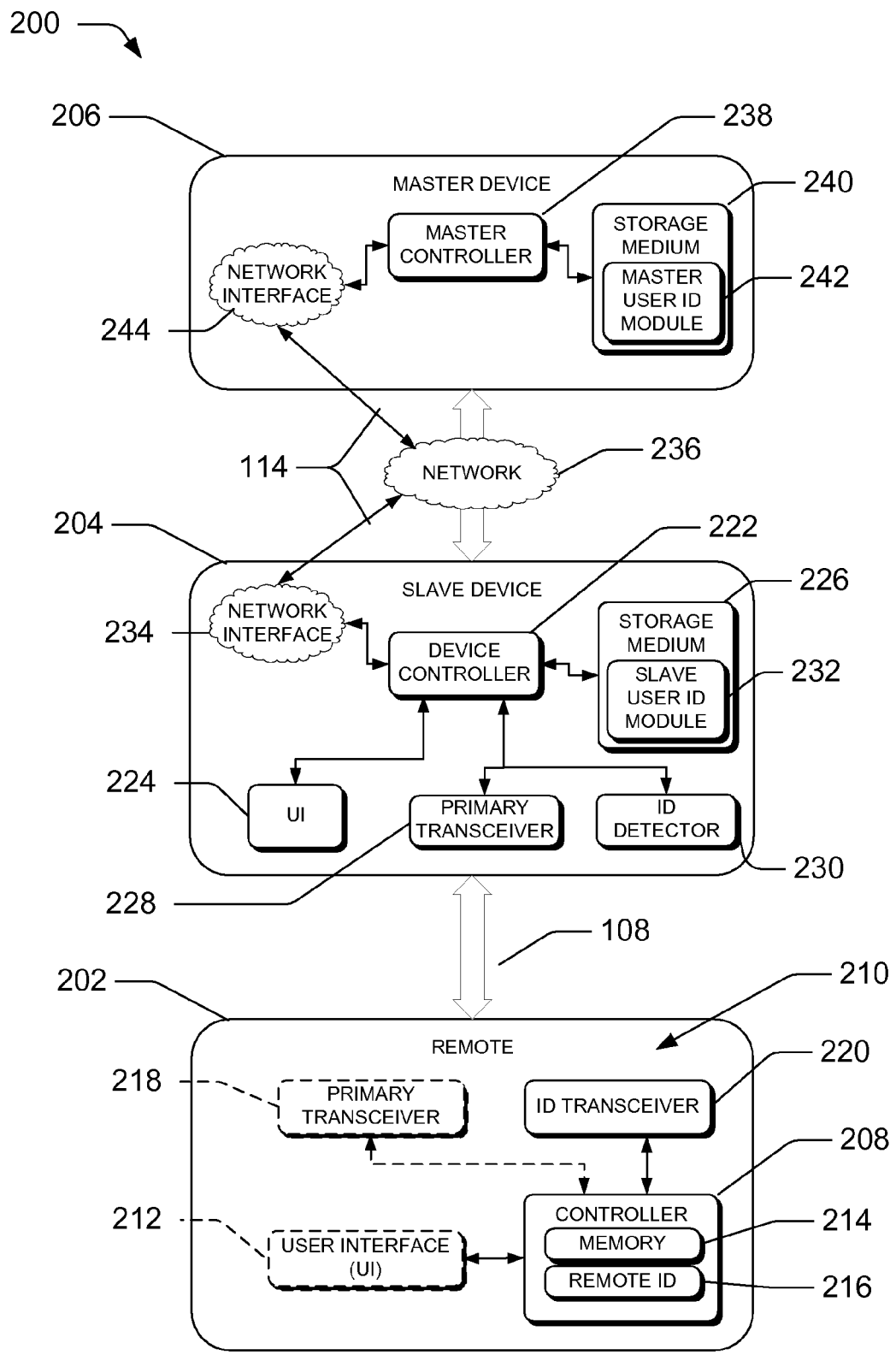
FIG. 2 is a block diagram of an illustrative system for providing personal multi-device nomadic media including a master device, slave device, and a remote, and how a system may be organized.

FIG. 2 is a block diagram of an illustrative environment 200 including a system for providing personal multi-device nomadic media. The environment 200 includes a remote 202, a slave device 204, and a master device 206, each discussed in turn.

In some embodiments, the remote 202 may include a controller 208 operably coupled to one or more transmitters 210. In some instances, the controller 208 may also be operably coupled to a user interface (UI) 212. For example, the optional UI 212 may include without limitation elements such as a keypad, a display, and other controls. The controller 208 may have memory 214, such as flash memory, and encoded information such as a remote identification (ID) 216. The transmitters 210 may include a primary transmitter 218 and an ID transmitter 220 for communicating with a device, such as the first device 104(1). For example, the primary transmitter 218 may transmit infrared control signals to a STB for changing the display on a television (e.g., to change channels, etc.). The ID transmitter 220 may be used to transmit information associated with a user, such as the user 110. For example, the ID transmitter may transmit an ID number associated with the user 110 to the slave device 204. In some instances, the transmitters 210 may be transceivers, thus enabling the remote 202 to transmit and receive signals.

In an embodiment, the remote 202 may include a transceiver, such as a RFID transmitter, for transmitting information associated with the user to the slave device 204. For example, the remote 202 may contain a passive RFID tag which may receive a request from the slave device 204 and transmit information associated with the user in response to the request. In one instance, the operation of the remote 202 may be primarily to transmit information associated with the user to the slave device 204.

The slave device 204 may have a device controller 222 operably coupled to a device user interface (UI) 224, a storage medium 226, a primary receiver 228, and an ID detector 230. The storage medium 226 may include a slave user ID module 232, which may include a set of instructions for registering a user on the slave device and/or the master device 206. For example, the primary receiver 228 may be enabled to receive a control signal from the remote 202 (which may include the functionality of a universal remote control), while the ID detector 230 may be transmit information associated with a user of the remote from the ID transceiver 220, such as to register the user on the slave device 204 and/or master device 206. In addition, the primary receiver 228 may also be a transceiver, and thus transmit information to the remote 202, such as channel information for projection on a display included in the user interface 212 of the remote 202.

In some embodiments, the slave device 204 may further include a network interface 234 operably connected to a network 236. The network interface 234 may allow the slave device 204 to transmit and/or receive information (e.g., content, etc.) with the master device 206. The network 236 may be a wired or wireless network and signals may be transmitted via, for example, Wi-Fi, Ethernet, Bluetooth®, or coaxial connections. In an illustrate example, the master device may be remotely located as a server in a network such as a community antenna television (CATV) network or accessed via the Internet for internet protocol television (IPTV), such as in a network digital video recorder (DVR) configuration.

The master device 206 may have a master controller 238 operably coupled to a storage medium 240. The storage medium 240 may include a master user ID module 242, which may include a set of instructions for registering a user on the master device 206 and recording other information associated with the user 110 and/or the remote 202. For example, the master user ID module 242 may include a log file which stores information about the content delivered to the user 110. The log file may include information relating to when the user (via the remote 202 and slave device 204) suspends the content delivered to the slave device. The master user ID module 242 may facilitate providing content deliver to another slave device (not shown), in connection via the network 236, to enable the user 110 to resume enjoying content at a new location with access to suspended content and other information stored in the log file. In addition, the master device 206 may include a network interface 242 for communicating with the slave device 204 via the network 236.

Figure 3:
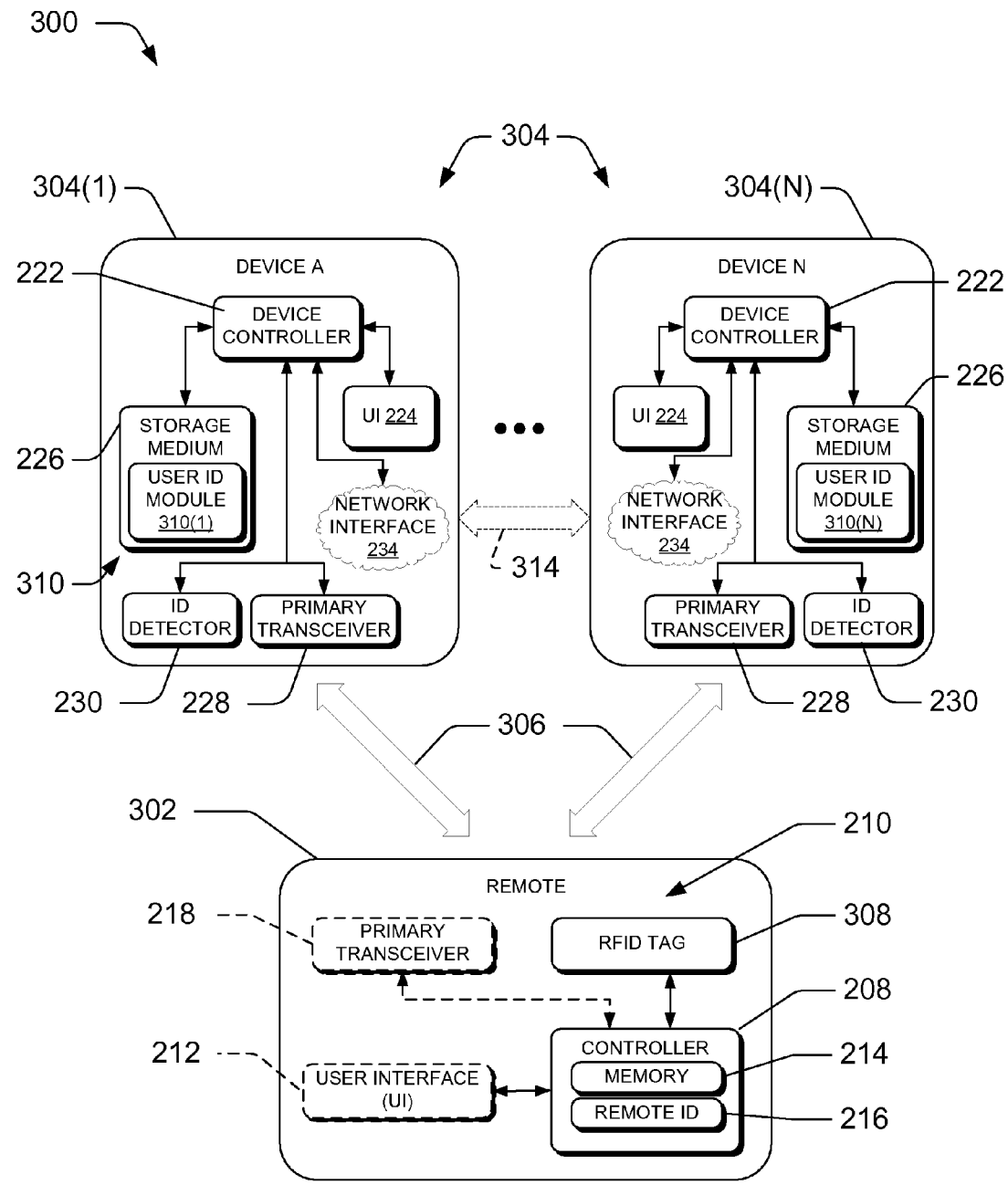
FIG. 3 is a block diagram of another illustrative configuration of a system for providing personal multi-device nomadic media and how a system may be organized.

FIG. 3 is a block diagram of another illustrative environment 300 including a system for providing personal multi-device nomadic media and how a system may be organized. The environment 300 is similar to the environment 200 shown in FIG. 2, and therefore only additional features will be described. The environment 300 includes a remote 302 in communication via signals 306 with a plurality of devices 304, such as a first device 304(1) and a second device 304(N).

In one embodiment, the remote 302 includes a RFID tag 308 for transmitting information associated with the user, such as a user ID, to the ID detector 230 on the device 304. For example, the RFID tag 308 may be a passive RFID tag which does not require an independent power source. In another embodiment, the remote 302 may transmit information associated with the user using the primary transceiver 218 in connection to the controller 208, having the memory 214 and the remote ID 216.

Each device 304 may include a user ID module 310. Therefore, it follows that the first device 304(1) includes a first user ID module 310(1) and the second device 304(N) includes a second user ID module 310(N). The user ID module 310 may store information received from the primary transceiver 218 and/or RFID tag 308 via the ID detector 230. In some embodiments, the devices 304 may be in communication with each other via a link 314. The link 314 may be a wired or wireless link, such as a Wi-Fi, Ethernet, Bluetooth®, or coaxial link.

In an illustrative operation, the second user ID module 310(N) may include a log file that records content delivery associated with the user 110. For example, the log file may include information that the user 110 is watching "The CBS Evening News®" on channel 6 and has suspended (i.e., paused) the program after five minutes and twenty seconds (5:20). The user may discontinue viewing the news on the second device 304(N) and move to a location having the first device 304(1). The user 110 may register on the first device 304(1), such as by passing the RFID tag 308 on the remote 302 within a predetermined proximity to the first device, such as within 1 meter. The first device 304(1) may request the log file stored in the second user ID module 310(N). The log file may be transmitted from the second device 304(N) to the first device 304(1) via the link 314. The first device 304(1) may read the log file and determine to resume delivering the program to the user 110, such as displaying "The CBS Evening News®" starting at five minutes and twenty seconds (5:20) into the program (i.e., the point where the user 110 suspended the program using the second device 304(N)). In other embodiments, the log file may be stored in a master device, either on the customer premises or in the network (e.g., network DVR). When the user registers at the second device 304(N), the second device retrieves the information from the master device, without the need to have direct communications link to other devices.

In another embodiment, the aforementioned log file may reside with the remote 302. For example, the log file may be created by the controller 208 and stored in the memory 214. When the user 110 suspends a program at the device 304, such as the second device 304(N), and relocates to a location having the first device 304(1), the log file may be transmitted from the remote 302 to the first device 304(1). In such an instance, the network interface 234 and/or the link 314 may not be necessary.

Illustrative Operation

Figure 4:
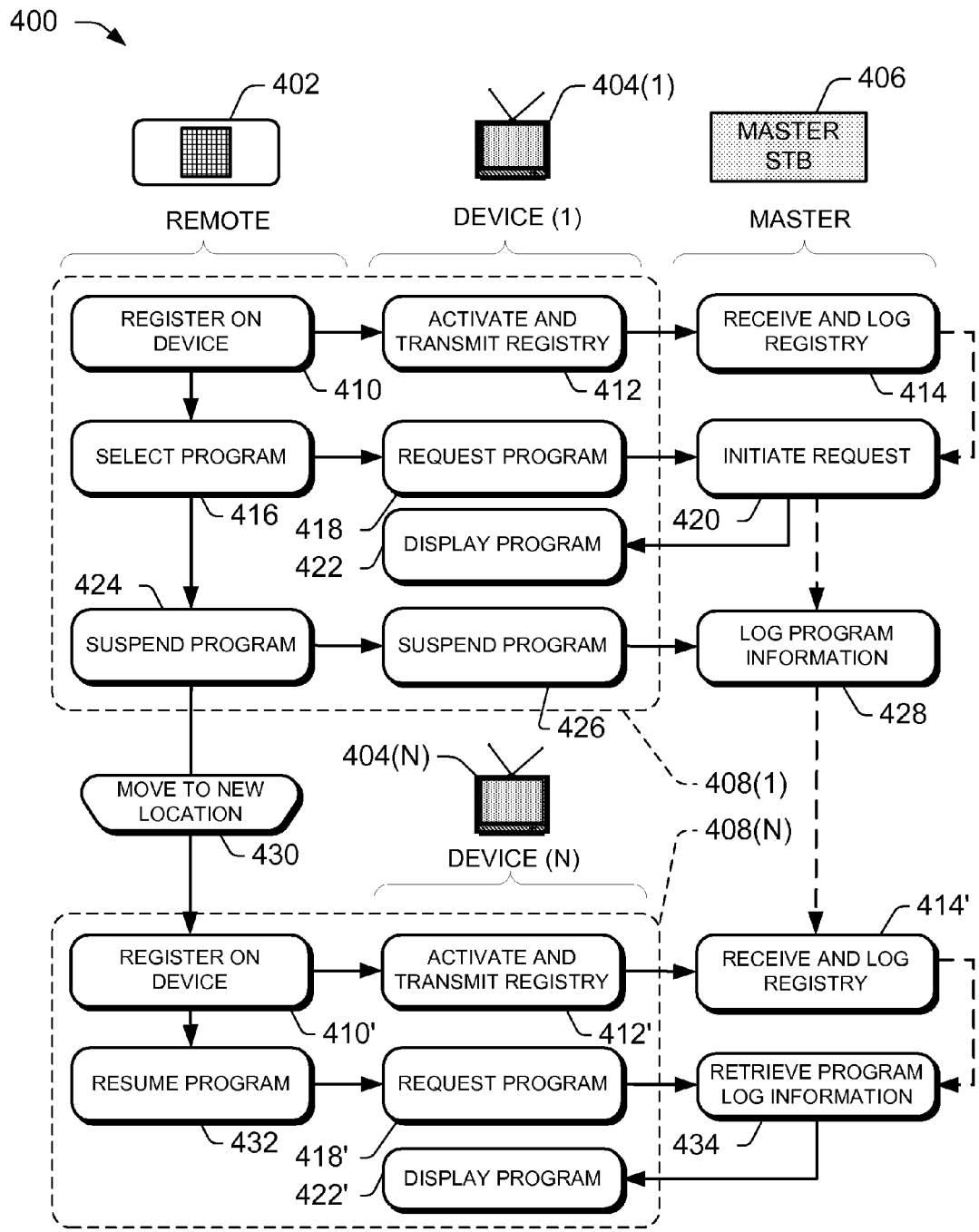
FIG. 4 is a flow diagram of an illustrative process of providing personal multi-device nomadic media including a master device and slave device in accordance with an embodiment of the disclosure.

FIG. 4 is a flow diagram of an illustrative process 400 of providing personal multi-device nomadic media including a remote 402, a first device 404(1), a second device 404(N), and a master device 406 in accordance with an embodiment of the disclosure. The first device 404(1) may be in a first location 408(1) while the second device 404(2) may be in a second location 408(N).

The process 400 may begin at a block 410 where a user registers on the first device 404(1) by transmitting a signal from the remote 402. For example, the RFID tag 308 on the remote may transmit information associated with the user to the first device 404(1) via the ID detector 230. At a block 412, the first device 404(1) may activate and transmit the registry to the master device 406 which receives and logs the registry at a block 414.

In some embodiments, the user may select a program using the remote 402 at a block 416. The remote 402 (via the primary transceiver 218) may transmit the program request to the first device 404(1). The request may be relayed by the first device at a block 418, initiated at the master device 406 at a block 420, and displayed, emitted, or the like (or caused to be displayed, emitted, etc.) at the first device at a block 422. For example, the master device 406 may transmit the content (e.g., program) to the first device 404(1) via a network 236.

At a block 424, the remote may be used to suspend the program. The first device 404(1) may receive the program suspension request at a block 426 and transmit the request to the master device 406 to create a log file at a block 428. For example, the master user ID module 242 may store a log file containing information associated with the user and information related to the program at the block 428. The media may be suspended at the master device, which may buffer the media to enable a pause in the media.

The user may relocate the remote 402 at a block 430 from the first location 408(1), such as a living room of the user's house, to the second location 408(N), such as a kitchen having the second device 404(N). As described above in the blocks 410, 412, 414, the user may register the device with the second device at blocks 410', 412', 414', respectively. In some embodiments, at a block 432, the remote may enable the user to resume the program. The second device 404(N) may relay the request to the master device 406 at a block 418'. At a block 434, the master device 406 may use information, such as information stored in the log file, to determine the point of program suspension, and thus facilitate providing the program to the user on the second device, at a block 422', without the user having to miss the delivery of any portion of the program.

In some embodiments, a portion of the process 400 may be accomplished with a single user operation via the remote 402. For example, the user may push a single button on the remote 402 that completes the process at the block 424 (suspend program) and turns off the first device 404(1). Another button press may turn on the second device 404(N) and accomplish the process at the block 410' (register to device) and the block 432 (resume program). Such an embodiment may simplify the process 400 of providing multi-device nomadic media to a user. The first device 402(1) may now free and available for use by another user to watch entirely different programming.

Figure 5:
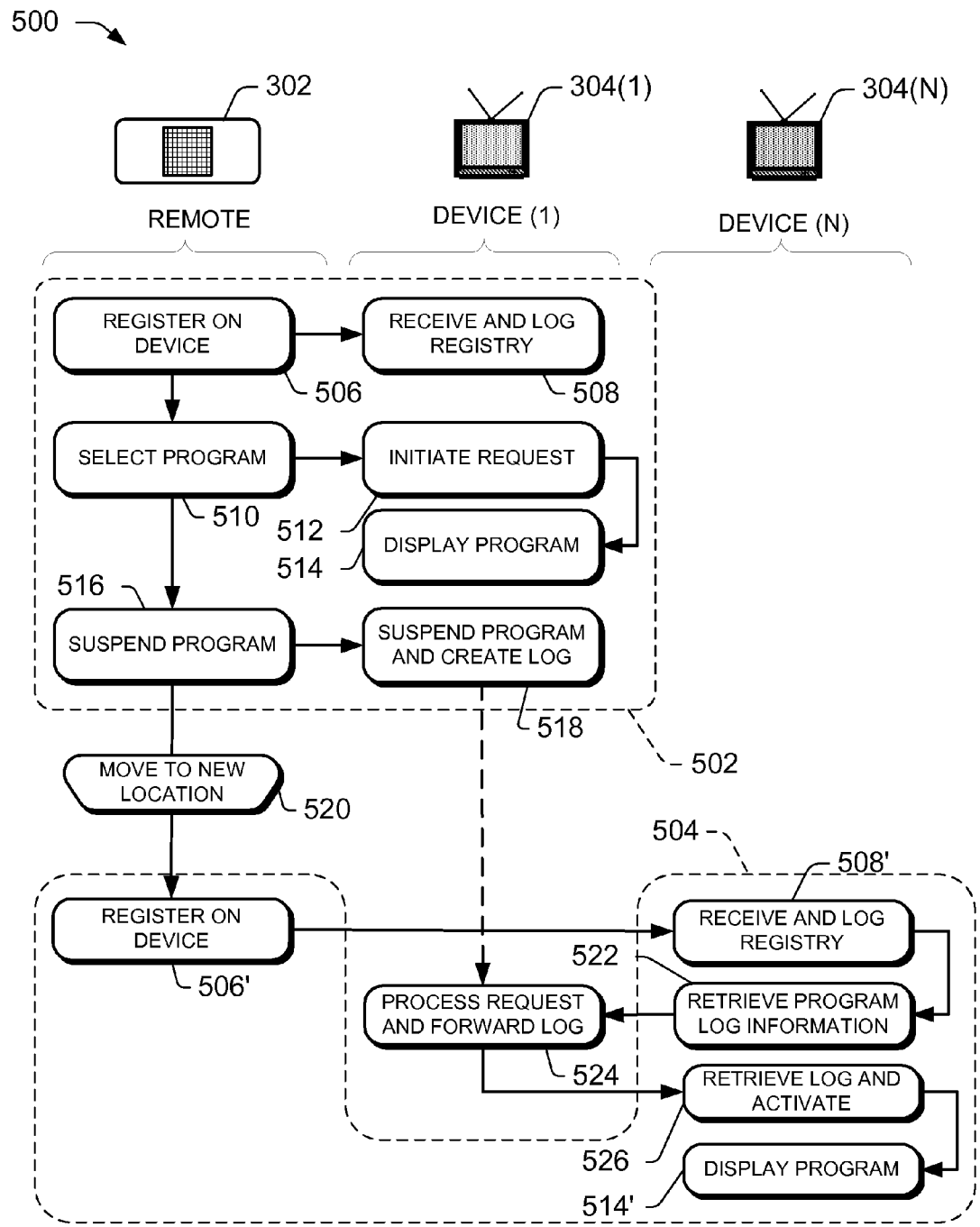
FIG. 5 is a flow diagram of another illustrative process of providing personal multi-device nomadic media between devices in accordance with an embodiment of the disclosure.

FIG. 5 is a flow diagram of another illustrative process 500 of providing personal multi-device nomadic media between devices in accordance with an embodiment of the disclosure. The process 500 includes the remote 302, the first device 304(1) at a first location 502, and the second device 304(N) at a second location 504.

At a block 506, a user registers on the first device 304(1) by transmitting a signal from the remote 302, the signal transmission information associated with the user. The first device 304(1) may receive and log the registry at a block 508. In some embodiments, the user may select a program using the remote 302 at a block 510. The program request may be transmitted from the remote 302 via the primary transceiver 218 to the first device 304(1), which initiates the program at a block 512 and displays, emits, or the like (or causes the display, emission, etc. of) the program at a block 514. At a block 516, the remote may be used suspend the program. The program suspension request may be received, executed, and/or logged by the first device 304(1) at a block 518. The user may relocate the remote 302 at a block 520 from the first location 502 to the second location 504 having the second device 304(N).

At the second location 504, the user may register on the second device 304(N) at a block 506'. At a block 508', the second device 304(N) may receive and log the registry. The second device 304(N) may then retrieve program log information for the first device 304(1), such as via the link 314, at a block 522. At the block 524, the first device 304(1) may process the request and forward log information to the second device 304(N), which may retrieve the log and activate the program. At a block 514', the second device 304' may display the program. Buffering of the media may or may not occur in the process 500. In some embodiments, buffering may be provided by the first device 304(1), which then transmits the buffered media to the second device 304(N) to enable the viewer to enjoy the media despite the delay in viewing when transitioning between the first device and the second device. Alternatively or additionally, the second device 304(N) may be streaming content and use the log file to retrieve non-real-time media.

Figure 6:
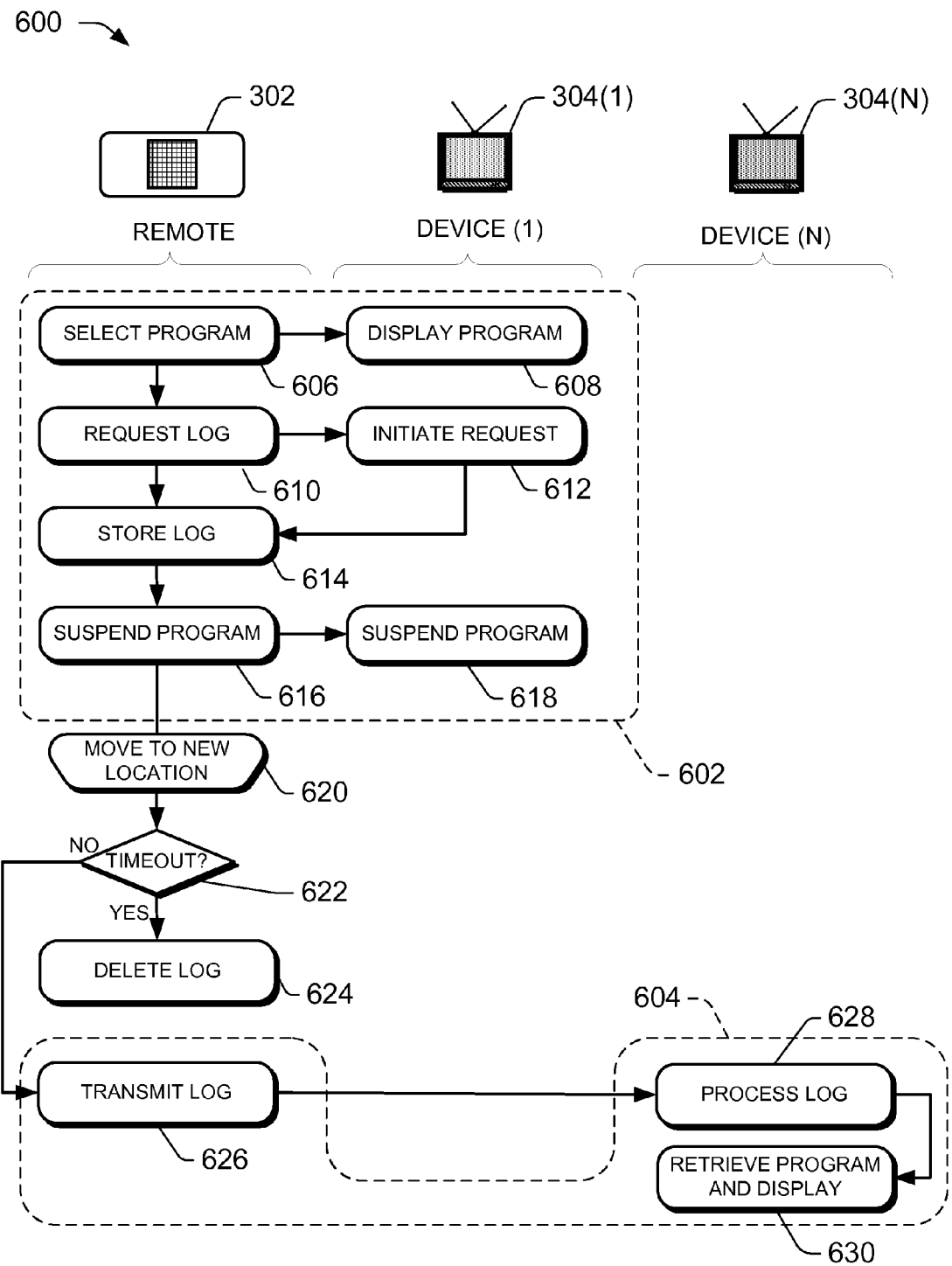
FIG. 6 is a flow diagram of yet another illustrative process of providing personal multi-device nomadic media including logging information on a remote in accordance with an embodiment of the disclosure.

FIG. 6 is a flow diagram of yet another illustrative process 600 of providing personal multi-device nomadic media including logging information on a remote in accordance with an embodiment of the disclosure. The process 600 includes the remote 302, the first device 304(1) at a first location 602, and the second device 304(N) at a second location 604.

In some embodiments, the user may select a program using the remote 302 at a block 606. The program may be displayed, emitted, etc (or caused to displayed, emitted, etc.) by the first device 304(1) at a block 608. At a block 610, the remote 302 may request a log from the first device 304(1). For example, when the user 110 suspends a program, the user may command the remote 302 to initiate the creation of a log file update. At the block 612, the first device 304(1) may initiate the request, which is stored at a block 614 on the remote 302. For example, the remote 302 may store the log file in the memory 214. At a block 616, the user may suspend the program via the remote 302, such that the remote may transmit a signal to the first device 304(1) to suspend the program at a block 618.

The user may relocate the remote 302 at a block 620 from the first location 602 to the second location 604 having the second device 304(N). At a decision block 622, the log file may timeout, such as after the expiration of a predetermined amount of time. If the timeout occurs, the log file may be deleted at a block 624. If no timeout occurs at the decision block 622, at the block 626, the user may cause the remote to transmit the log to the second device 304(N). The second device 304(N) may process the log at block 628 and retrieve the program and cause a display of the program at a block 630.

In an illustrative example, the user 110 may be enjoying a radio program while traveling in an automobile on the way home from work. When the user 110 arrives home, she may desire to continue listening to the radio program in her home. The user 110 may use techniques and/or systems disclosed herein to provide multi-device nomadic media. For example, the user 110 may cause the remote 302 to create a log file associated with the user and the program information while in her automobile, relocate to the house, and resume the program from the point of suspension on her home stereo (e.g., the first device 304(1)). It is also contemplated that the user 110 may suspend video or other entertainment media using similar techniques. In particular, the user 110 may desire to suspend video displayed in an automobile and resume the program on a home device. The user may not miss any media content if the media is buffered, as discussed above in a streaming or DVR environment.

In another embodiment, the user 110 may desire to relocate to another location while continuing the program content delivery in the first location, thus using techniques and/or systems disclosed herein to provide multi-device nomadic media. For example, a father may leave the family room while the family is watching the program in real time on a STB in connection to a DVR device as configured in FIG. 2. The father may desire to suspend the program for his own enjoyment in another location, such as the kitchen. The father may cause the remote 402 to create a log file on the master device 406, allowing the father to resume the content on the second device 404(N) in the kitchen, without missing any content. The other family members may continue watching the program without an interruption on the first device 404(1). In such an instance, the father would initially resume the content non-real time content delivery while the rest of the family may continue to receive the program in a real time delivery.

Conclusion

Although techniques for providing personal multi-device nomadic media have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A method for providing a multi-device media network that comprises a first media delivery device and a second media delivery device, the method comprising:

delivering content to a user from the first media delivery device responsive to selection of the content by the user using a remote, the remote transmitting information associated with the user to a master device;
suspending delivery of the content from the first media delivery device using the remote;
activating the second media delivery device using the remote, the second media delivery device transmitting the information associated with the user to the master device enabling the master device to recall previous viewing information associated with the user to the master such that delivery of the content from the first media delivery device to the user can be resumed from the second media delivery device,
wherein the master device provides content to the first media delivery device and the second media delivery device, the first and second media delivery devices being slave devices.

2. The method of claim 1, wherein suspending delivery of the content includes creating a log file associated with the user registration.

3. The method of claim 1, wherein resuming delivery of the suspended content further includes:
receiving a user registration at the master device;
retrieving user content associated with the user registration; and
transmitting the user content to the second media delivery device for delivery to the user.

4. The method of claim 2, wherein receiving a user registration on the second media delivery device includes scanning a radio-frequency identification tag associated with the remote, the radio-frequency identification tag having a user identification which is associated with the log file.

5. The method of claim 4, wherein the log file includes a list of users associated with a personal remote radio-frequency identification tag.

6. The method of claim 4, wherein the log file is updated after a time out occurs, the time out being measured from a time the content is suspended on the first media delivery device.

7. The method of claim 1, further comprising receiving a user registration on the first media delivery device.

8. A media delivery device, comprising:
a user identification detector configured to receive a signal from a remote that includes a user identification;
a network interface for communicating the user identification to a second media delivery device; and
a device controller operably coupled to the user identification detector and the network interface, the device controller delivering a media content to a user associated with the user identification, the controller further configured to:
suspend the media content on the media delivery device; and
transmit a packet to the second media delivery device, the packet including the user identification associated with the media content, the packet enabling the second media delivery device to resume the media content from a point of suspension on the media delivery device;
wherein the media delivery device comprises a first media delivery device, wherein a master device provides content to the first media delivery device and the second media delivery device, the first and second media delivery devices being slave devices.

9. The media delivery device of claim 8, wherein the user identification device is configured to communicate with a radio-frequency identification tag for receiving the user identification.

10. The media delivery device of claim 8, wherein the network interface is in communication with a master device, the master device providing content to the media delivery device based on the user identification associated with the media delivery device, the master device enabled to suspend the content provided to the user on the media delivery device and resume the content provided to the user on the second media delivery device.

11. The media delivery device of claim 10, wherein the media delivery device is a set top box.

12. The media delivery device of claim 10, wherein the master device is a digital video recorder.

13. The media delivery device of claim 8, wherein the media delivery device further includes:
a transceiver for transmitting suspended content information to the second media delivery device and for receiving suspended content information from the second media delivery device, the transceiver operably coupled to the media delivery device controller to enable a user to suspend the media content delivered to the user on the media delivery device and resume the content provided to the user on the second media delivery device.

14. The media delivery device of claim 13, wherein the second media delivery device is a remote enabled to receive and transmit the user identification and suspended content information.

15. A non-transitory computer-readable media comprising computer executable instructions that, when executed, perform a method of providing multi-device nomadic media, comprising:
transmitting content associated with a user to a first media delivery device;
creating a log file of the content associated with the user on the first media delivery device; and
transmitting the log file and content associated with the user to a second media delivery device, the second media delivery device enabling the user to resume the content transmitted to the first media delivery device from a non-real time point in the content based on the log file, wherein the first and second media delivery devices are slave devices,
wherein creating the log file of the content associated with the user includes creating a log file on a remote, the remote enabling a user to relocate to a second location and transmit the log file to the second media delivery device; and
wherein a master device provides content to the first media delivery device and the second media delivery device, the first and second media delivery devices being slave devices.

16. The computer-readable media of claim 15, wherein the content is transmitted to the first media delivery device at a first point in the content and simultaneously transmitted to the second media delivery device at a second point in the content.

17. The computer-readable media of claim 15, wherein transmitting content associated with a user further includes determining the user by passing a radio-frequency identification tag within a proximity to the first media delivery device to transmit a user identification.

18. The computer-readable media of claim 15, wherein the first media delivery device and the second media delivery device are configured to facilitate sharing a user log file which contains a user identification and content associated with the user identification, the user log file enabling the second media delivery device to resume the content transmitted to the first media delivery device.

* * * * *